United States Patent
Moriwaki et al.

(10) Patent No.: US 10,779,366 B2
(45) Date of Patent: Sep. 15, 2020

(54) LIGHTING APPARATUS, LUMINAIRE, MOVABLE OBJECT, CONTROL METHOD, AND NON-TRANSITORY RECORDING MEDIUM

(71) Applicant: Panasonic Intellectual Property Management Co., Ltd., Osaka (JP)

(72) Inventors: Toshiya Moriwaki, Osaka (JP); Masanobu Murakami, Osaka (JP); Masahiko Koizeki, Osaka (JP); Takashi Kambara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/576,837

(22) Filed: Sep. 20, 2019

(65) Prior Publication Data

US 2020/0100338 A1    Mar. 26, 2020

(30) Foreign Application Priority Data

Sep. 25, 2018    (JP) ................................ 2018-179429
Aug. 22, 2019    (JP) ................................ 2019-152365

(51) Int. Cl.
| | |
|---|---|
| *B60Q 1/14* | (2006.01) |
| *H05B 45/00* | (2020.01) |
| *F21S 41/148* | (2018.01) |
| *H05B 45/37* | (2020.01) |
| *B60Q 1/04* | (2006.01) |
| *F21S 41/30* | (2018.01) |
| *F21S 45/47* | (2018.01) |
| *B60Q 3/80* | (2017.01) |

(52) U.S. Cl.
CPC ............ *H05B 45/00* (2020.01); *F21S 41/148* (2018.01); *H05B 45/37* (2020.01); *B60Q 1/04* (2013.01); *B60Q 3/80* (2017.02); *F21S 41/30* (2018.01); *F21S 45/47* (2018.01)

(58) Field of Classification Search
CPC ...................................................... B60Q 3/80
USPC ......................................................... 315/77
See application file for complete search history.

(56) References Cited

U.S. PATENT DOCUMENTS

| | | | |
|---|---|---|---|
| 2007/0138975 A1* | 6/2007 | Suganuma | ......... H05B 41/2883 315/291 |
| 2018/0063907 A1* | 3/2018 | Kambara | ............. B60Q 1/0094 |

FOREIGN PATENT DOCUMENTS

JP        2009-182097 A    8/2009

* cited by examiner

*Primary Examiner* — Thuy Vinh Tran
(74) *Attorney, Agent, or Firm* — Renner, Otto, Boisselle & Sklar, LLP

(57) ABSTRACT

A lighting apparatus includes a control circuit configured to control a power supply circuit such that a measurement value of an output current measured by a current measuring device approaches a target value. The control circuit is configured to execute a control mode alternatively selected from the plurality of control modes to control the power supply circuit. The plurality of control modes of the control circuit includes at least a first control mode and a second control mode. The first control mode is a control mode of adjusting the target value in accordance with a first direct-current voltage. The second control mode is a control mode which includes adjusting the target value regardless of the first direct-current voltage.

13 Claims, 5 Drawing Sheets

LIGHTING APPARATUS, LUMINAIRE, MOVABLE OBJECT, CONTROL METHOD, AND NON-TRANSITORY RECORDING MEDIUM

CROSS-REFERENCE TO RELATED APPLICATION

The present application is based upon and claims the benefit of priority of Japanese Patent Applications No. 2018-179429, filed on Sep. 25, 2018, and No. 2019-152365, filed on Aug. 22, 2019, the entire contents of which are incorporated herein by reference.

TECHNICAL FIELD

The present disclosure relates to lighting apparatuses, luminaires, movable objects, control methods, and non-transitory recording media. More specifically, the present disclosure relates to a lighting apparatus which is supplied with power from a direct-current power supply such as a storage battery to turn on (to light) an illumination load, a luminaire including the lighting apparatus and the illumination load, a movable object on which the luminaire is mounted, a control method of controlling the lighting apparatus, and a non-transitory recording medium which stores a computer program for realizing the control method.

BACKGROUND ART

As a conventional example, Document 1 (JP 2009-182097 A) describes a power supply apparatus (lighting apparatus) for driving LEDs. In the conventional example, a direct-current voltage supplied from a secondary battery (storage battery) is stepped up and is then output to an LED unit (illumination load) so as to turn on the LED unit. Moreover, in the conventional example, a battery voltage of the secondary battery is monitored, and if the battery voltage is within a normal range, an output current led to the LED unit is subjected to constant current control. Alternatively, if the battery voltage falls below the normal range, the output current led to the LED unit is reduced.

In the lighting apparatus of the conventional example, when the battery voltage (input voltage) varies in a short cycle, the output current also varies in a short cycle in accordance with the battery voltage. When the output current of the lighting apparatus varies in a short cycle, the quantity of light of the LED unit may also vary in a short cycle, which may cause flickering.

SUMMARY

An object of the present disclosure is to provide a lighting apparatus, a luminaire, a movable object, a control method, and a non-transitory recording medium which are capable of reducing the occurrence of flickering of an illumination load, flickering being caused due to variation of an input voltage.

A lighting apparatus according to one aspect of the present disclosure includes a power supply circuit and a current measuring device. The power supply circuit is configured to perform voltage conversion of a first direct-current voltage into a second direct-current voltage to apply the second direct-current voltage to an illumination load so as to supply an output current which is a direct current to the illumination load. The current measuring device is configured to measure the output current. The lighting apparatus includes a control circuit configured to control the power supply circuit such that a measurement value of the output current measured by the current measuring device approaches a target value. The control circuit is configured to execute one control mode selected from a plurality of control modes including a first control mode and a second control mode to control the power supply circuit. The first control mode is a control mode of adjusting the target value in accordance with the first direct-current voltage. The second control mode is a control mode which includes adjusting the target value regardless of the first direct-current voltage.

A luminaire according to one aspect of the present disclosure includes the lighting apparatus, and an illumination load which is to be turned on by the output current of the lighting apparatus.

A movable object according to one aspect of the present disclosure includes the luminaire, and a body on which the luminaire is mounted.

A control method according to one aspect of the present disclosure includes: a current measurement step of measuring an output current which is a direct current output from a power supply circuit to an illumination load; and a control step of controlling the power supply circuit such that a measurement value of the output current measured in the current measurement step approaches a target value. The control step includes executing one control mode selected from a plurality of control modes including a first control mode and a second control mode to control the power supply circuit. The first control mode is a control mode of adjusting the target value in accordance with the first direct-current voltage. The second control mode is a control mode which includes adjusting the target value regardless of the first direct-current voltage.

A non-transitory recording medium according to one aspect of the present disclosure stores a computer program. The computer program is designed to make a computer system execute the control method.

BRIEF DESCRIPTION OF THE DRAWINGS

The figures depict one or more implementations in accordance with the present teaching, by way of example only, not by way of limitation. In the figures, like reference numerals refer to the same or similar elements.

DETAILED DESCRIPTION

Figures described in the following embodiment are schematic views, and the ratio of sizes and the ratio of thicknesses of components do not necessarily reflect actual dimensional ratios. Note that a configuration described in the following embodiment is a mere example of the present disclosure. The present disclosure is not limited to the following embodiment, and various modifications may be made based on design and the like as long as the effect of the present disclosure is achieved.

Figure 1:
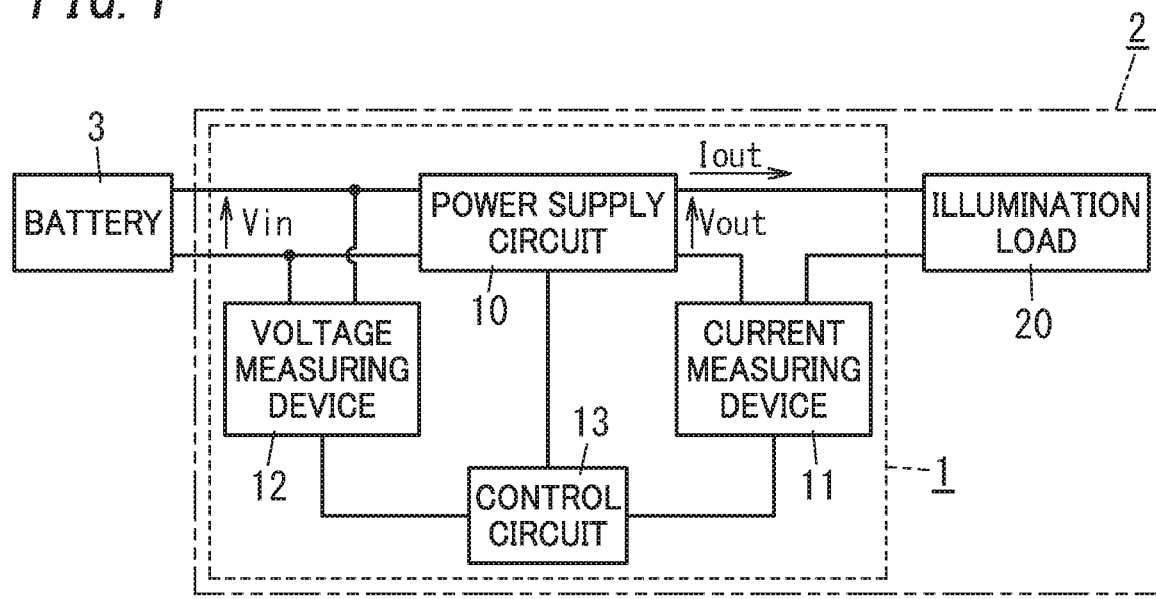
FIG. 1 is a block diagram illustrating a lighting apparatus and a luminaire according to an embodiment of the present disclosure.

As illustrated in FIG. 1, a luminaire 2 according to an embodiment includes a lighting apparatus 1 according to an embodiment and an illumination load 20 which is to be turned on by the lighting apparatus 1. Note that the lighting apparatus 1 is supplied with power from a direct-current power supply (e.g., battery 3) to turn on the illumination load 20.

The illumination load 20 is, for example, an LED module including a plurality of light emitting diodes (LEDs). Note that the illumination load 20 may be a solid-state light source, such as an organic electroluminescent element or a semiconductor laser element, other than the LEDs.

The battery 3 has, for example, a rated voltage of 12 V and is a battery (in-vehicle battery) for an automobile.

The lighting apparatus 1 includes a power supply circuit 10, a current measuring device 11, a voltage measuring device 12, and a control circuit 13. The power supply circuit 10 is, for example, a boost-type DC/DC converter. Note that the power supply circuit 10 may be, for example, a back-type or back-boost-type DC/DC converter. The power supply circuit 10 performs voltage conversion of an input voltage Vin which is a direct current voltage (first direct-current voltage) input from the battery 3 into a second direct-current voltage (output voltage Vout). The power supply circuit 10 applies the output voltage Vout to the illumination load 20 to supply an output current Iout which is a direct current to the illumination load 20. Note that the quantity of light of the illumination load 20 changes in accordance with the magnitude of the output current Iout of the power supply circuit 10 (lighting apparatus 1). That is, as the magnitude of the output current Iout increases/decreases, the quantity of light of the illumination load 20 increases/decreases.

The current measuring device 11 measures the output current Iout of the power supply circuit 10. The current measuring device 11 includes a resistor inserted in an electric path (conductor) which allows the output current Iout to flow from the power supply circuit 10 to the illumination load 20. The current measuring device 11 outputs a voltage drop which occurs at both ends of the resistor due to flow of the output current Iout (a voltage across the resistor) as a measurement value of the output current Iout to the control circuit 13.

The voltage measuring device 12 measures the input voltage Vin input from the battery 3. The voltage measuring device 12 includes a plurality of resistors electrically connected in series to a pair of input terminals of the power supply circuit 10. The voltage measuring device 12 outputs a voltage obtained by dividing the input voltage Vin by the plurality of resistors as a measurement value of the input voltage Vin to the control circuit 13.

The control circuit 13 preferably includes a computer system. The computer system may include, as principal hardware components, a processor and memory. The processor executes a program stored in the memory of the computer system, thereby realizing functions as the control circuit 13 in the present disclosure. The program may be stored in the memory of each computer system in advance, provided via a telecommunications network, or provided via a non-transitory recording medium such as a computer system-readable memory card, an optical disc, or a hard disk drive storing the program. The processor of the computer system is composed of one or more electronic circuits including a semiconductor integrated circuit (IC) or a large-scale integrated circuit (LSI). The integrated circuit such as IC or LSI mentioned herein may be referred to in another way, depending on the degree of the integration and includes integrated circuits called system LSI, very-large-scale integration (VLSI), or ultra-large-scale integration (VLSI). A field-programmable gate array (FPGA), which is programmable after fabrication of the LSI, or a logical device which allows reconfiguration of connections in LSI or reconfiguration of circuit cells in LSI may be adopted as the processor. Those electronic circuits may be either integrated together on a single chip or distributed on multiple chips without limitation. Those multiple chips may be integrated together in a single circuit or distributed in multiple circuits without limitation. As mentioned herein, the computer system includes a microcontroller including one or more processors and one or more memory components. Thus, the microcontroller is also composed of one or more electronic circuits including a semiconductor integrated circuit or a large-scale integrated circuit.

The control circuit 13 performs A/D conversion of a voltage obtained by dividing the input voltage Vin as input from the voltage measuring device 12. The control circuit 13 receives the voltage after the A/D conversion as a measurement value (digital value) of the input voltage Vin. The control circuit 13 stores, in the memory, the measurement value of the input voltage Vin thus received. Moreover, the control circuit 13 receives, from the current measuring device 11, the voltage across the resistor included in the current measuring device 11 and performs A/D conversion of the voltage across the resistor. The control circuit 13 receives the voltage after the A/D conversion as a measurement value (digital value) of the output current Iout. The control circuit 13 stores, in the memory, the measurement value of the output current Iout thus received.

The control circuit 13 determines a target value of the output current Iout based on the measurement value of the input voltage Vin. For example, the memory of the control circuit 13 stores a data table representing a correspondence relationship of measurement values of the input voltage Vin to target values of the output current Iout. The control circuit 13 refers to the data table to determine a target value of the output current Iout corresponding to the measurement value of the input voltage Vin.

The control circuit 13 performs PWM control of the power supply circuit 10 based on a control signal provided thereto. The control signal includes a square wave pulse train with a constant cycle. The control signal is a signal whose duty ratio is adjustable. Note that as the duty ratio of the control signal increases (becomes high), the output current Iout of the power supply circuit 10 increases. As the duty ratio of the control signal decreases (becomes low), the output current Iout of the power supply circuit 10 decreases. That is, the control circuit 13 obtains a difference between the measurement value of the output current Iout measured by the current measuring device 11 and the target value of the output current Iout. The control circuit 13 adjusts the duty ratio of the control signal provided to the power supply circuit 10 so that the difference decreases.

The control circuit 13 includes a plurality of control modes for controlling the power supply circuit 10. At a given time, the control circuit 13 executes a control mode selected from the plurality of control modes to control the power supply circuit 10. The plurality of control modes includes at least a first control mode and a second control mode. The first control mode is a control mode of adjusting the target value of the output current Iout in accordance with the (measurement value of) input voltage Vin. The second control mode is a control mode which includes adjusting the target value of the output current Iout regardless of the (measurement value of) input voltage Vin.

Figure 2:
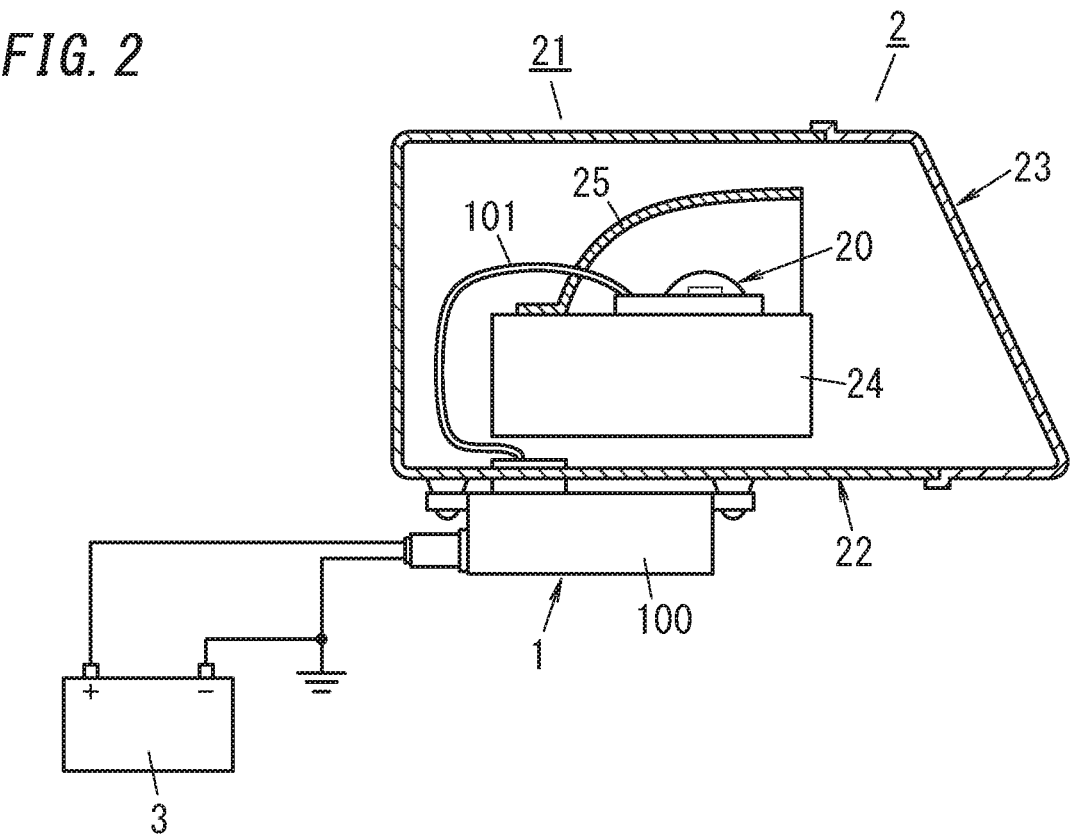
FIG. 2 is a sectional view illustrating the luminaire of the embodiment.
Figure 3:
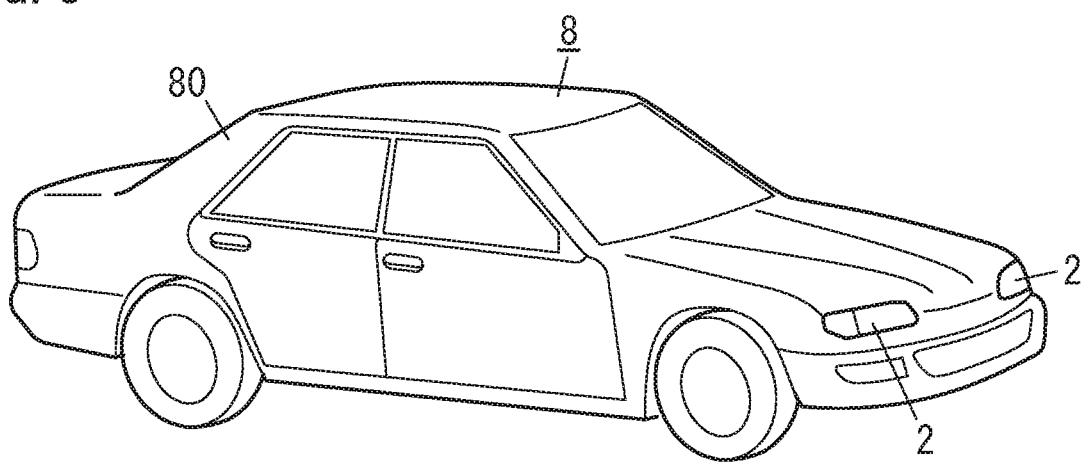
FIG. 3 is a perspective view illustrating a movable object (e.g., automobile) according to the embodiment of the present disclosure.

Here, the luminaire 2 will be described in further detail. The luminaire 2 is a headlamp device (headlight) to be mounted on a vehicle body 80 (body) of an automobile 8 (movable object) as shown in FIG. 3. As illustrated in FIG. 2, the luminaire 2 includes a lamp 21 in addition to the lighting apparatus 1 and the illumination load 20. The lamp 21 holds the lighting apparatus 1 and the illumination load 20 and is attached to the vehicle body 80.

The lamp 21 includes a lamp body 22, a cover 23, a heat dissipation body 24, a reflector 25, and other components. The lamp body 22 is made of a synthetic resin and has a bottomed tube shape with its front surface being open. The cover 23 is made of a light-transmissive material, such as quartz glass or an acrylic resin and has a bottomed tube shape with its rear surface being open. A front end of the lamp body 22 is coupled to a rear end of the cover 23, thereby closing the front end of the lamp body 22 with the cover 23. The illumination load 20, the heat dissipation body 24, and the reflector 25 are accommodated in the lamp body 22.

The heat dissipation body 24 is preferably a flat plate having one surface provided with a large number of heat dissipation fins formed of, for example, an aluminum die cast. The heat dissipation body 24 has an upper surface to which the illumination load 20 and the reflector 25 are attached. The reflector 25 has a hemispherical shape. Light output from the illumination load 20 is reflected off an inner peripheral surface of the reflector 25 frontward.

The lighting apparatus 1 is accommodated in a case 100. The case 100 is attached to a lower surface of or in the lamp body 22. Moreover, when the lighting apparatus 1 is attached in the lamp body 22, the lighting apparatus 1 does not have to be accommodated in the case 100. Note that the lighting apparatus 1 and the illumination load 20 are preferably electrically connected to each other via a power supply cable 101.

On the automobile 8 are mounted variety of electrical loads (e.g., air conditioner, audio apparatus, navigation system, and starter motor) in addition to the luminaire 2. These electrical loads are supplied with power from the battery 3 mounted on the automobile 8. Thus, the power supply voltage of the battery 3 varies in accordance with the state of power supplied to the variety of electrical loads. For example, the voltage of an in-vehicle battery having a rated voltage (nominal voltage) of 12 V varies within a range from about 10 V to 15 V in normal usage. Moreover, factors such as aging and weather may temporarily reduce the voltage of the in-vehicle battery to or lower than 7 V.

Thus, in the luminaire 2, the battery 3 has to be protected (a battery has to be prevented from being dead) by reducing a current (output current Tout) supplied to the illumination load 20 when the power supply voltage (input voltage Vin) of the battery 3 decreases. Thus, when the power supply voltage (input voltage Vin) of the battery 3 decreases, the control circuit 13 of the lighting apparatus 1 reduces the target value of the output current Tout to protect the battery 3.

Figure 4:
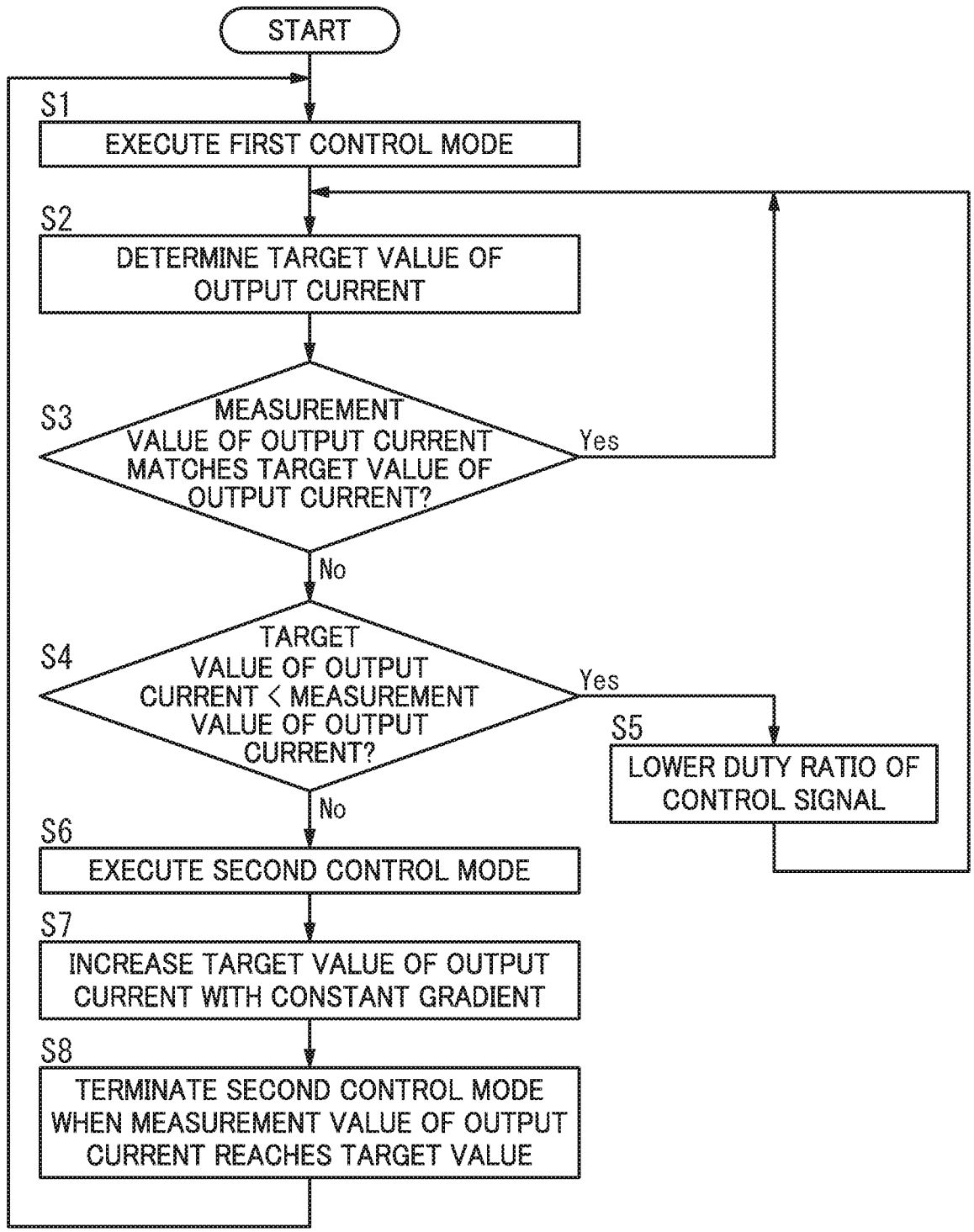
FIG. 4 is a flowchart illustrating operation of the lighting apparatus of the invention.

Next, the operation of the control circuit 13 of the lighting apparatus 1 will be described in detail with reference to the flowchart in FIG. 4.

When supplying power from the battery 3 to the lighting apparatus 1 is started, the control circuit 13 is activated. The control circuit 13 executes a first control mode by default (initial setting) (step S1). The control circuit 13 determines the target value of the output current Tout (step S2) in accordance with the measurement value of the input voltage Vin input from the voltage measuring device 12. If the measurement value of the input voltage Vin is within a prescribed range (e.g., 11 V to 13 V) including the rated voltage (12 V) of the battery 3, the control circuit 13 matches the target value of the output current Tout to the rated current of the illumination load 20. The control circuit 13 sets the duty ratio of the control signal to a value corresponding to the rated current of the illumination load 20 and outputs the control signal to the power supply circuit 10.

The control circuit 13 determines whether or not the measurement value of the output current Tout matches the target value of the output current Tout (step S3). Note that the term "match" mentioned herein not only refers to a state where the measurement value of the output current Tout is equal to the target value of the output current Tout but also means a state where the absolute value of a difference between the measurement value of the output current Tout and the target value of the output current Tout is lower than or equal to a prescribed value. If the measurement value of the output current Tout matches the target value of the output current Tout, the control circuit 13 does not change the duty ratio of the control signal, and the control circuit 13 determines the target value of the output current Tout again in accordance with the measurement value of the input voltage Vin (step S2). At this time, if the input voltage Vin is within the above-described range (e.g., 11 V to 13 V), the control circuit 13 does not change the target value of the output current Tout. If the measurement value of the output current Tout does not match the target value of the output current Tout, the control circuit 13 determines whether or not the measurement value of the output current Tout is larger than the target value of the output current Tout (step S4). If the measurement value of the output current Tout is larger than the target value of the output current Tout, the control circuit 13 lowers the duty ratio of the control signal to reduce the output current Tout (step S5). After the control circuit 13 lowers the duty ratio of the control signal, the control circuit 13 determines the target value of the output current Tout again in accordance with the measurement value of the input voltage Vin (step S2). However, if the input voltage Vin is within the above-mentioned range (e.g., 11 V to 13 V), the control circuit 13 does not change the target value of the output current Tout. Thus, the control circuit 13 repeats the process from step S2 to step S5, which enables the measurement value of the output current Tout to be matched to the target value of the output current Tout.

On the other hand, if the measurement value of the output current Tout does not match the target value of the output current Tout and the measurement value of the output current Tout is smaller than the target value of the output current Tout, the control circuit 13 switches the control mode from the first control mode to the second control mode to execute the second control mode (step S6). During the second control mode, the control circuit 13 increases the target value of the output current Iout with constant gradient (constant change rate) without referring to the measurement value of the input voltage Vin and (step S7). When the measurement value of the output current Iout then reaches the target value of the output current Iout, the control circuit 13 terminates the second control mode (step S8) and returns to step S1 to execute the first control mode. Here, the change rate (gradient) of the target value of the output current Iout in the second control mode is preferably smaller than the change rate (gradient) of the target value of the output current Iout in the first control mode.

Figure 5A:
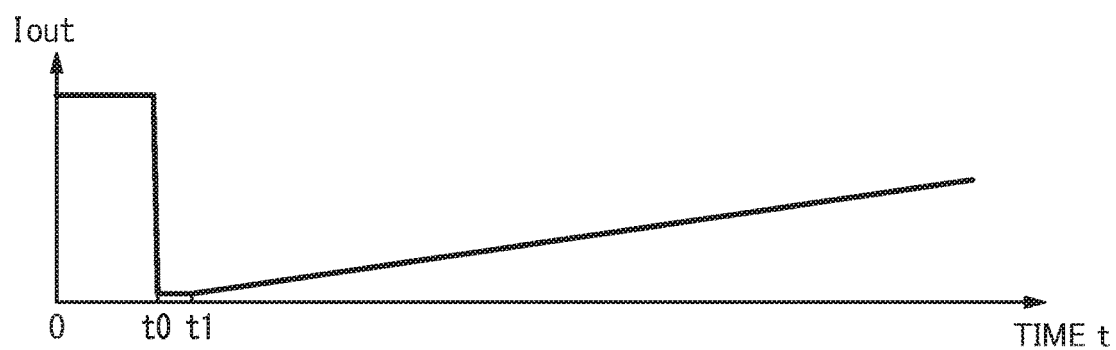
FIG. 5A is a waveform diagram of an output current in the lighting apparatus of the embodiment.

Here, the power supply voltage (input voltage Vin) of the battery 3 may significantly vary within a short time. For example, in an automobile having a so-called idling stop function, rising and falling of the input voltage Vin of the lighting apparatus 1 may be repeated within a short time when an engine is restarted. FIG. 5C shows an example of a change of the input voltage Vin with time when the engine is restarted after idling stop. In FIG. 5C, in order to restart the engine at time t=t0, a starter motor operates and thereby, the input voltage Vin rapidly decreases close to a lower limit voltage VL. Note that the lower limit voltage VL is the lower limit of the input voltage Vin at which the lighting apparatus 1 is operable. Then, when time t=t1 has passed, the input voltage Vin also varies in accordance with variation of power consumption by the starter motor. Then, the engine is started and the starter motor is then stopped, which stabilizes the input voltage Vin substantially at the rated voltage.

Figure 5B:
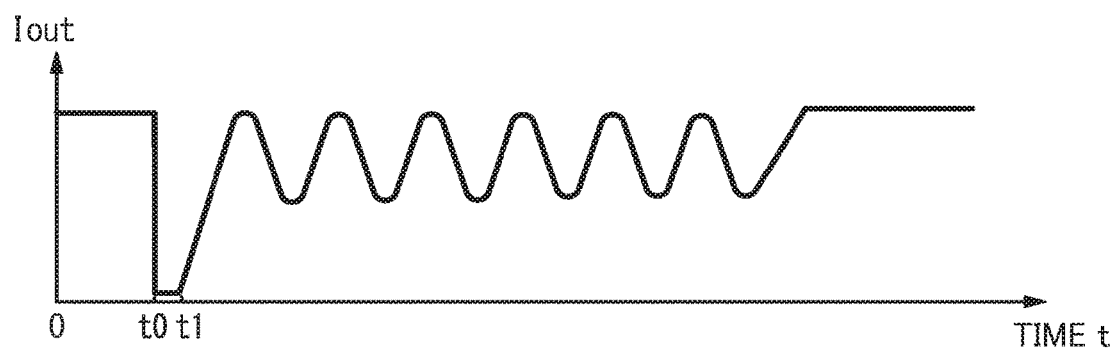
FIG. 5B is a waveform diagram of an output current in a comparative example of the lighting apparatus of the embodiment.
Figure 5C:
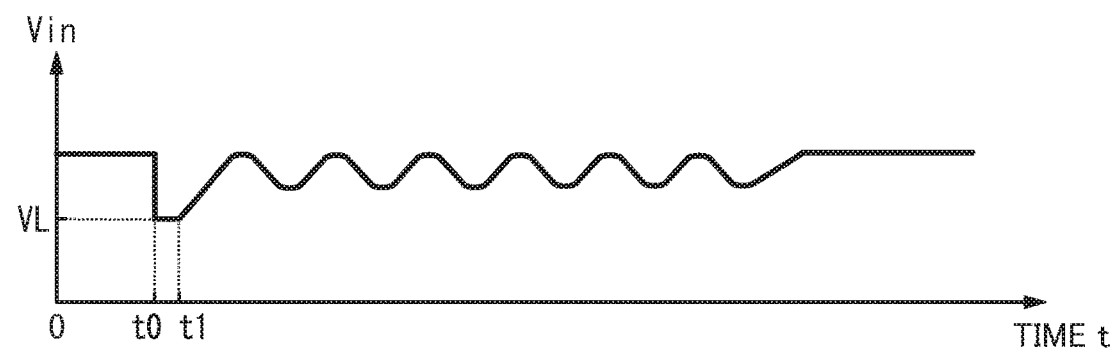
FIG. 5C is a waveform diagram of an input voltage in the lighting apparatus of the embodiment.

When the control circuit 13 of the lighting apparatus 1 adjusts the target value of the output current Iout always in accordance with the input voltage Vin, the output current Iout also significantly varies in accordance with the input voltage Vin as illustrated in FIG. 5B. When the output current Iout significantly varies, the quantity of light of the illumination load 20 also varies, thereby causing flickering.

When the input voltage Vin significantly varies, however, the control circuit 13 executes the second control mode when the measurement value of the output current Iout is smaller than the target value of the output current Iout. That is, the control circuit 13 increases the target value of the output current Iout with constant gradient (change rate) without referring to the measurement value of the input voltage Vin. As a result, the output current Iout increases, as illustrated in FIG. 5A, from time t=t1 with constant gradient. Thus, in the lighting apparatus 1 and the luminaire 2 of the embodiment, variation of the output current Iout is suppressed when the input voltage Vin varies, and thereby, it is possible to reduce the occurrence of flickering of the illumination load 20 caused by variation of the input voltage Vin.

Figure 6:
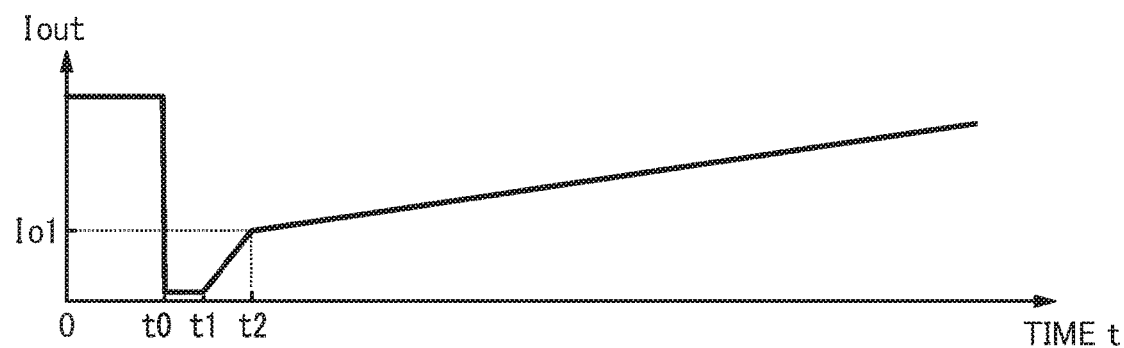
FIG. 6 is a waveform diagram of the output current in the lighting apparatus of the embodiment.

Note that the control circuit 13 preferably switches a change rate in a case of increasing the target value of the output current Iout during the second control mode (hereinafter referred to as an increase change rate) between a first change rate and a second change rate. The first change rate is preferably lower than a change rate in the case of reducing the target value of the output current Tout during the first control mode (hereinafter referred to as a decrease change rate). The second change rate is preferably higher than the first change rate. For example, when the target value increased during the second control mode is smaller than a threshold Io1 (time t=t1 to t2) as illustrated in FIG. 6, the control circuit 13 preferably increases the target value at the second change rate. Moreover, the control circuit 13 preferably increases the target value at the first change rate when the target value is larger than or equal to the threshold Io1 (at and after time t=t2).

The control circuit 13 operates as described above, which enables the lighting apparatus 1 to reduce a time until the quantity of light of the illumination load 20 reaches a specified value (rated value) while reducing flickering of the illumination load 20.

The variation of the input voltage Vin at the restart of the engine may converge within a short time. When the variation of the input voltage Vin converges within a short time, it is desirable that the quantity of light of the illumination load 20 rapidly reaches a preset value (the rated value).

Thus, when the amount of the variation of the input voltage Vin during the second control mode is less than the threshold, the control circuit 13 preferably switches the increase change rate to a third change rate. Note that the third change rate is preferably higher than the first change rate and particularly preferably higher than or equal to the second change rate.

Figure 7A:
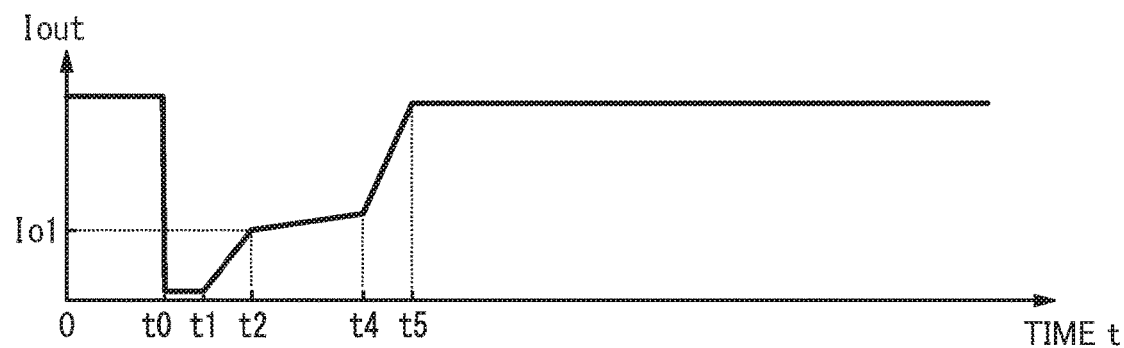
FIG. 7A is a waveform diagram of the output current in the lighting apparatus of the embodiment.
Figure 7B:
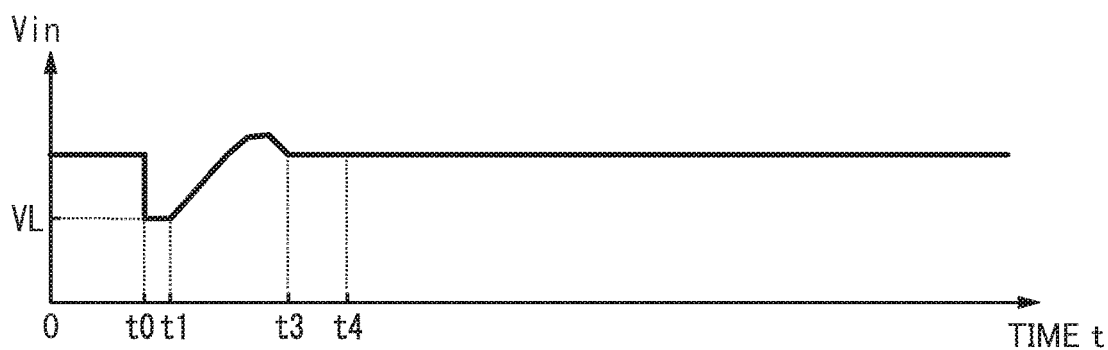
FIG. 7B is a waveform diagram of the input voltage in the lighting apparatus of the embodiment.

The control circuit 13 computes, during the second control mode, change rate of the measurement value of the voltage measuring device 12, and when the change rate of the measurement value of the voltage measuring device 12 is less than the threshold (time t=t4 in FIG. 7B), the control circuit 13 determines that the variation of the input voltage Vin converges. The control circuit 13 changes the increase change rate from the first change rate to the third change rate (time t=t4 in FIG. 7A). This enables the lighting apparatus 1 to cause also the quantity of light of the illumination load 20 to reach the preset value (the rated value) within a short time (time t=t4 to t5 in FIG. 7A).

As described above, a lighting apparatus (1) of a first aspect includes a power supply circuit (10) configured to perform voltage conversion of a first direct-current voltage (input voltage Vin) into a second direct-current voltage (output voltage Vout) to apply the second direct-current voltage to an illumination load (20) so as to supply an output current (Tout) which is a direct current to the illumination load (20). The lighting apparatus (1) of the first aspect includes a current measuring device (11) configured to measure the output current (Tout) and a control circuit (13) configured to control the power supply circuit (10) such that a measurement value of the output current (Iout) measured by the current measuring device (11) approaches a target value. The control circuit (13) is configured to execute one control mode selected from a plurality of control modes including a first control mode and a second control mode to control the power supply circuit (10). The first control mode is a control mode of adjusting the target value in accordance with the first direct-current voltage. The second control mode is a control mode which includes adjusting the target value regardless of the first direct-current voltage.

In the lighting apparatus (1) of the first aspect, the control circuit (13) executes the second control mode. Thus, it is possible to reduce the occurrence of flickering of the illumination load (20) caused due to variation of the first direct-current voltage.

A lighting apparatus (1) of a second aspect is realizable in combination with the first aspect. In the lighting apparatus (1) of the second aspect, the control circuit (13) is preferably configured to execute the first control mode when the measurement value of the output current (Tout) is larger than or equal to the target value. The control circuit (13) is preferably configured to execute the second control mode when the measurement value of the output current (Tout) is smaller than the target value.

In the lighting apparatus (1) of the second aspect, an increasing speed of the output current (Iout) is suppressed.

Thus, it is possible to further reduce the occurrence of the flickering of the illumination load (20).

A lighting apparatus (1) of a third aspect is realizable in combination with the first or second aspect. In the lighting apparatus (1) of the third aspect, the control circuit (13) is preferably configured to control such that an increase change rate in a case of increasing the target value during the second control mode is smaller than a decrease change rate in a case of reducing the target value during the first control mode.

In the lighting apparatus (1) of the third aspect, an increasing speed of the output current (Tout) is suppressed. Thus, it is possible to further reduce the occurrence of the flickering of the illumination load (20).

A lighting apparatus (1) of a fourth aspect is realizable in combination with the third aspect. In the lighting apparatus (1) of the fourth aspect, the control circuit (13) is preferably configured to switch an increase change rate between a first change rate and a second change rate. The first change rate is preferably lower than the decrease change rate. The second change rate is preferably higher than the first change rate.

The lighting apparatus (1) of the fourth aspect to reduce a time until the quantity of light of the illumination load (20) reaches a specified value (a rated value) while flickering of the illumination load (20) is reduced.

A lighting apparatus (1) of a fifth aspect is realizable in combination with the fourth aspect. In the lighting apparatus (1) of the fifth aspect, the control circuit (13) is preferably configured to switch the increase change rate from the second change rate to the first change rate.

The lighting apparatus (1) of the fifth aspect to reduce a time until the quantity of light of the illumination load (20) reaches the specified value (the rated value) while flickering of the illumination load (20) is reduced.

A lighting apparatus (1) of a sixth aspect is realizable in combination with the fifth aspect. In the lighting apparatus (1) of the sixth aspect, the control circuit (13) is preferably configured to increase the target value at the second change rate when the target value is smaller than the threshold during the second control mode. The control circuit (13) is preferably configured to increase the target value at the first change rate when the target value is larger than or equal to the threshold.

The lighting apparatus (1) of the sixth aspect enables the quantity of light of the illumination load (20) to reach a preset value (the rated value) within a short time.

A lighting apparatus (1) of a seventh aspect is realizable in combination with any one of the fourth to sixth aspect. In the lighting apparatus (1) of the seventh aspect, the control circuit (13) is preferably configured to switch the increase change rate to a third change rate higher than the first change rate when an amount of variation of the input voltage (Vin) during the second control mode is less than the threshold.

The lighting apparatus (1) of the seventh aspect enables the quantity of light of the illumination load (20) to reach the preset value (the rated value) within a shorter time.

A lighting apparatus (1) of an eighth aspect is realizable in combination with any one of the first to seventh aspect. The lighting apparatus (1) of the eighth aspect preferably includes a voltage measuring device (12) configured to measure the first direct-current voltage. The control circuit (13) is preferably configured to execute either the first control mode or the second control mode depending on the first direct-current voltage measured by the voltage measuring device (12).

The lighting apparatus (1) of the eighth aspect enables the variation of the first direct-current voltage to be securely detected by the voltage measuring device (12).

A luminaire (2) of a ninth aspect includes the lighting apparatus (1) of any one of the first to eighth aspect, and an illumination load (20) which is to be turned on by the output current (Tout) of the lighting apparatus (1).

The luminaire (2) of the ninth aspect enables the occurrence of flickering of the illumination load (20) caused by the variation of the input voltage (Vin) to be reduced.

A movable object (automobile 8) of a tenth aspect includes the luminaire (2) of the ninth aspect, and a body (vehicle body 80) on which the luminaire (2) is mounted.

The movable object of the tenth aspect enables the occurrence of flickering of the illumination load (20) caused by the variation of the input voltage (Vin) to be reduced.

A control method of an eleventh aspect includes a current measurement step of measuring an output current (Tout) which is a direct current output from a power supply circuit (10) to an illumination load (20); and a control step of controlling the power supply circuit (10) such that a measurement value of the output current (Tout) measured in the current measurement step approaches a target value. The control step includes executing one control mode selected from a plurality of control modes including a first control mode and a second control mode to control the power supply circuit (10). The first control mode is a control mode of adjusting the target value in accordance with the first direct-current voltage. The second control mode is a control mode which includes adjusting the target value regardless of the first direct-current voltage.

A non-transitory recording medium of a twelfth aspect stores a computer program. The computer program is designed to make a computer system (control circuit 13) execute the control method of the eleventh aspect.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting apparatus comprising:
   a power supply circuit configured to perform voltage conversion of a first direct-current voltage into a second direct-current voltage to apply the second direct-current voltage to an illumination load so as to supply an output current which is a direct current to the illumination load;
   a current measuring device configured to measure the output current; and
   a control circuit configured to control the power supply circuit such that a measurement value of the output current measured by the current measuring device approaches a target value,
   the control circuit being configured to execute one control mode selected from a plurality of control modes including a first control mode and a second control mode to control the power supply circuit,
   the first control mode being a control mode of adjusting the target value in accordance with the first direct-current voltage, and the second control mode being a control mode which includes adjusting the target value regardless of the first direct-current voltage.

2. The lighting apparatus of claim 1, wherein
the control circuit is configured to execute the first control mode when the measurement value of the output current is larger than or equal to the target value, and
the control circuit is configured to execute the second control mode when the measurement value of the output current is smaller than the target value.

3. The lighting apparatus of claim 2, wherein
the control circuit is configured such that an increase change rate in a case of increasing the target value during the second control mode is smaller than a decrease change rate in a case of reducing the target value during the first control mode.

4. The lighting apparatus of claim 1, wherein
the control circuit is configured such that an increase change rate in a case of increasing the target value during the second control mode is smaller than a decrease change rate in a case of reducing the target value during the first control mode.

5. The lighting apparatus of claim 4, wherein
the control circuit is configured to switch an increase change rate between a first change rate lower than the decrease change rate and a second change rate higher than the first change rate.

6. The lighting apparatus of claim 5, wherein
the control circuit is configured to switch the increase change rate from the second change rate to the first change rate.

7. The lighting apparatus of claim 6, wherein
the control circuit is configured to increase the target value at the second change rate when the target value is smaller than the threshold during the second control mode, and the control circuit is configured to increase the target value at the first change rate when the target value is larger than or equal to the threshold.

8. The lighting apparatus of claim 5, wherein
the control circuit is configured to switch the increase change rate to a third change rate higher than the first change rate when an amount of variation of the input voltage during the second control mode is less than the threshold.

9. The lighting apparatus of claim 1 further comprising a voltage measuring device configured to measure the first direct-current voltage, wherein
the control circuit is configured to execute the first control mode when the first direct-current voltage measured by the voltage measuring device is within a prescribed range, and to execute the second control mode when the first direct-current voltage measured by the voltage measuring device is without the prescribed range.

10. A luminaire, comprising:
the lighting apparatus of claim 1; and
the illumination load which is to be turned on by the output current of the lighting apparatus.

11. A movable object, comprising:
the luminaire of claim 10; and
a body on which the luminaire is mounted.

12. A control method, comprising:
a current measurement step of measuring an output current which is a direct current output from a power supply circuit to an illumination load; and
a control step of controlling the power supply circuit such that a measurement value of the output current measured in the current measurement step approaches a target value,
the control step including executing one control mode selected from a plurality of control modes including a first control mode and a second control mode to control the power supply circuit,
the first control mode being a control mode of adjusting the target value in accordance with the first direct-current voltage, and
the second control mode being a control mode which includes adjusting the target value regardless of the first direct-current voltage.

13. A non-transitory readable medium storing a computer program having codes embedded therein including instructions that, when executed by a processor included in a computer system, causing the computer system to carry out comprising:
a current measurement step of measuring an output current which is a direct current output from a power supply circuit to an illumination load; and
a control step of controlling the power supply circuit such that a measurement value of the output current measured in the current measurement step approaches a target value, wherein
the control step including executing one control mode selected from a plurality of control modes including a first control mode and a second control mode to control the power supply circuit,
the first control mode being a control mode of adjusting the target value in accordance with the first direct-current voltage, and
the second control mode being a control mode which includes adjusting the target value regardless of the first direct-current voltage.

* * * * *